(12) United States Patent
Kim et al.

(10) Patent No.: US 11,931,896 B2
(45) Date of Patent: Mar. 19, 2024

(54) ROBOT SYSTEM FOR CONTROLLING LOAD OF MACHINE DEPENDING ON TOOL WEAR AND METHOD FOR CONTROLLING LOAD OF MACHINE USING THE SAME

(71) Applicant: KOREA INSTITUTE OF INDUSTRIAL TECHNOLOGY, Cheonan-si (KR)

(72) Inventors: Tae Gon Kim, Seongnam-si (KR); Seok Woo Lee, Seongnam-si (KR); Hyo Young Kim, Anseong-si (KR)

(73) Assignee: Korea Institute of Industrial Technology, Cheonan-si (KR)

( * ) Notice: Subject to any disclaimer, the term of this patent is extended or adjusted under 35 U.S.C. 154(b) by 349 days.

(21) Appl. No.: 16/760,257

(22) PCT Filed: Oct. 30, 2018

(86) PCT No.: PCT/KR2018/013002
§ 371 (c)(1),
(2) Date: Apr. 29, 2020

(87) PCT Pub. No.: WO2019/088649
PCT Pub. Date: May 9, 2019

(65) Prior Publication Data
US 2020/0353618 A1 Nov. 12, 2020

(30) Foreign Application Priority Data
Oct. 30, 2017 (KR) .................. 10-2017-0142749

(51) Int. Cl.
*B25J 9/16* (2006.01)
*B25J 9/00* (2006.01)
*B25J 11/00* (2006.01)

(52) U.S. Cl.
CPC ............ *B25J 9/1633* (2013.01); *B25J 9/0096* (2013.01); *B25J 11/005* (2013.01); *G05B 2219/37256* (2013.01); *G05B 2219/49086* (2013.01)

(58) Field of Classification Search
CPC .... B25J 9/1633; B25J 11/0055; B25J 11/005; B25J 11/006; B25J 9/0096; B25J 9/1697;
(Continued)

(56) References Cited

U.S. PATENT DOCUMENTS

2001/0054223 A1* 12/2001 Yamanashi .............. B23Q 1/66
414/754
2007/0020065 A1* 1/2007 Kirby ..................... B23Q 1/035
414/1
(Continued)

FOREIGN PATENT DOCUMENTS

DE 102008044401 A1 * 6/2010 ......... B23Q 17/0985
JP 10-011125 A 1/1998
(Continued)

*Primary Examiner* — Khoi H Tran
*Assistant Examiner* — Tanner L Cullen
(74) *Attorney, Agent, or Firm* — Rabin & Berdo, P.C.

(57) ABSTRACT

A robot system for adjusting a machining load depending on tool wear includes a robot that is coupled to a machining unit, moves the machining unit to change a position of a tool with respect to a machining target, and has a plurality of joints. The robot system further includes a support that supports the machining target and moves the machining target to change a position of the machining target with respect to the tool, a sensor unit that is provided on the machining unit and measures an amount of current supplied to a machining motor which operates the tool or an operation force of the tool, and a controller that receives a measurement signal from the sensor unit and transmits a control signal to the robot and the support.

8 Claims, 2 Drawing Sheets

(58) Field of Classification Search
CPC ........... G05B 2219/49086; G05B 2219/43156; G05B 2219/43157; G05B 2219/37256; G05B 19/4163; G05B 19/4166; G05B 19/18; B23Q 15/16; B23Q 15/08; B23Q 15/013; B23Q 17/0985; B23Q 15/18; B23Q 15/12; B23Q 1/035; B23Q 3/088; B25B 11/005

See application file for complete search history.

(56) References Cited

U.S. PATENT DOCUMENTS

| | | | | |
|---|---|---|---|---|
| 2013/0010070 A1* | 1/2013 | Tateno | ................... | B25J 9/1697 901/14 |
| 2013/0075119 A1* | 3/2013 | Guo | ..................... | G05B 19/404 173/1 |
| 2013/0189043 A1* | 7/2013 | Uchiuzo | ................ | B23Q 15/12 408/1 R |
| 2014/0371900 A1* | 12/2014 | Lee | ........................... | B23C 1/00 700/173 |
| 2015/0202014 A1 | 7/2015 | Kim et al. | | |
| 2016/0089789 A1* | 3/2016 | Sato | ........................ | B25J 13/088 700/254 |
| 2017/0100839 A1* | 4/2017 | Kai | ..................... | F16M 11/2014 |
| 2017/0304937 A1* | 10/2017 | Miyashita | ............ | B23K 26/035 |
| 2018/0161952 A1* | 6/2018 | Gu | ...................... | B24B 27/0038 |
| 2019/0022814 A1* | 1/2019 | Nakayama | ........... | G05B 19/048 |
| 2020/0108481 A1* | 4/2020 | Matsuo | .................. | B23Q 35/10 |
| 2020/0122336 A1* | 4/2020 | Matsuo | .................. | B25J 9/1633 |
| 2021/0394326 A1* | 12/2021 | Wiker | ................ | B23Q 11/0092 |

FOREIGN PATENT DOCUMENTS

| | | | | | |
|---|---|---|---|---|---|
| JP | 2009061565 A | * | 3/2009 | ............. | B23Q 15/16 |
| JP | 2016-132067 A | | 7/2016 | | |
| JP | 2016132067 A | * | 7/2016 | .............. | B25J 13/08 |
| KR | 10-1996-0003211 | | 3/1996 | | |
| KR | 10-2014-0008244 A | | 1/2014 | | |
| KR | 10-1668765 B1 | | 10/2016 | | |
| KR | 10-2016-0141230 A | | 12/2016 | | |

* cited by examiner

ROBOT SYSTEM FOR CONTROLLING LOAD OF MACHINE DEPENDING ON TOOL WEAR AND METHOD FOR CONTROLLING LOAD OF MACHINE USING THE SAME

TECHNICAL FIELD

The present invention relates to a robot system for adjusting a machining load depending on tool wear and a method for adjusting the machining load using the robot system, and more specifically, to a system in which it is possible to control a movement speed of a machining unit such that a machining load value of the machining unit is maintained to be equal to or smaller than a reference machining load value, and thus it is possible to lower a defective rate of a machining target and to improve stability of a robot.

BACKGROUND ART

Recently, an articulated robot that automatically performs machining is used in various fields due to factory automation in industrial sites, and a usage thereof is continually increased.

Besides, the robot is developed to perform not only an assembly process of assembling a plurality of parts but also various processes such as a machining process, a polishing process, and a painting process on a machining target.

Among the various processes, in a cutting process performed by a robot, it can be important to control the robot that automatically measures a degree of tool wear and performs the cutting process depending on the degree of tool wear.

However, in the related art, a problem arises in that a cutting process is performed while a degree of tool wear is checked by an imaging device or naked eye and thus a defective rate of the machining target increases.

Korean Patent No. 1996-0003211 discloses a monitoring method for a tool-wear N.C. cutting system that is characterized by automatically measuring tool wear with an image by installing a structure or a jig to put, at a suitable position, a C.C.D camera which is used to monitor an NC lathe and the tool wear during cutting of milling, or installing a camera at an end of a robotic arm having a function of transferring a completed structure to a conveyor belt or an unmanned and automated transportation vehicle, and by moving a universal robotic arm to a suitable position under link-control performed by an N.C. controller and a robot controller when machining proceeds to the next process after one process or after machining of the structure is completely ended.

CITATION LIST

Prior Patent Literature

[Prior Patent Literature 1]
Korean Patent No. 1996-0003211

SUMMARY OF INVENTION

Technical Problem

An object of the present invention to solve the problem described above is that a process is performed while a machining load of a machining unit is automatically controlled to decrease when the machining load of the machining unit increases in a process using a robot.

The technical object to be achieved by the present invention is not limited to the technical object mentioned above, and the following description enables other unmentioned technical objects to be clearly understood by a person of ordinary skill in the art to which the present invention belongs.

Solution to Problem

According to the present invention to achieve the object described above, there is provided a configuration including: a robot that is coupled to a machining unit, moves the machining unit to change a position of a tool with respect to a machining target, and has a plurality of joints; a support that supports the machining target and moves the machining target to change a position of the machining target with respect to the tool; a sensor unit that is provided on the machining unit and measures an amount of current supplied to a machining motor which operates the tool or an operation force of the tool; and a controller that receives a measurement signal from the sensor unit and transmits a control signal to the robot and the support, wherein when a machining load value of the machining unit is larger than a reference machining load value, the controller controls the robot or the support to decrease relative movement speeds of the machining unit and the machining target.

In an embodiment of the present invention, the machining unit may perform drilling, milling, routing, or grinding on the machining target.

In the embodiment of the present invention, the controller may derive the machining load value of the machining unit based on the amount of current supplied to the machining motor.

In the embodiment of the present invention, the controller may have a position computing unit that stores three-dimensional shape data of the machining target and computes relative positions of the tool and the machining target, and an operation control unit that controls an operation of the robot and an operation of the support based on a position value of the tool or a position value of the machining target which are derived by the position computing unit.

The embodiment of the present invention may further include an imaging unit that is coupled to the machining unit and acquires an image of the machining target.

The embodiment of the present invention may further include a dust removing unit that is coupled to the machining unit and removes dust on a surface of the machining target.

In the embodiment of the present invention, the support may have a jig unit that comes into contact with the machining target to support the machining target and adjusts a position angle of the machining target with respect to the tool, and a jig driving unit that is coupled to the jig unit and causes the jig unit to move and perform a tilting motion.

In the embodiment of the present invention, the machining unit may have a temperature measuring unit that measures a temperature of the surface of the machining target which is brought into contact with the tool.

The embodiment of the present invention may further include a wear measuring unit that measures an amount of tool wear.

According to the present invention to achieve the object described above, there is provided another configuration including: i) a step in which the sensor unit measures an amount of current supplied to the machining motor; ii) a step in which the controller receives a measurement signal from the sensor unit; iii) a step in which the controller derives a machining load value of the machining unit based on the amount of current supplied to the machining motor, and compares the machining load value of the machining unit and the reference machining load value; iv) a step in which the controller transmits a control signal to the robot or the support when the machining load value of the machining unit is larger than the reference machining load value; and v) a step in which a movement speed of the machining unit with respect to the machining target is decreased under operation control of the robot or the support.

Advantageous Effects of Invention

The present invention according to the configurations described above has the following effects. It is possible to control a movement speed of a machining unit such that a machining load value of a machining unit is maintained to be equal to or smaller than a reference machining load value, and thus it is possible to lower a defective rate of a machining target and to improve stability of a robot.

Effects of the present invention are construed not to be limited to the above-mentioned effects but to include every effect that can be derived from configurations of the invention described in the detailed description of the embodiments or claims of the present invention.

DESCRIPTION OF PREFERRED EMBODIMENT

A preferred embodiment of the present invention includes: a robot that is coupled to a machining unit, moves the machining unit to change a position of a tool with respect to a machining target, and has a plurality of joints; a support that supports the machining target and moves the machining target to change a position of the machining target with respect to the tool; a sensor unit that is provided on the machining unit and measures an amount of current supplied to a machining motor which operates the tool or an operation force of the tool; and a controller that receives a measurement signal from the sensor unit and transmits a control signal to the robot and the support, wherein when a machining load value of the machining unit is larger than a reference machining load value, the controller controls the robot or the support to decrease relative movement speeds of the machining unit and the machining target.

DESCRIPTION OF EMBODIMENTS

Hereinafter, the present invention will be described with reference to the accompanying drawings. However, the present invention can be realized as various different examples and, thus, is not limited to embodiments described here. Besides, a part irrelevant to the description is omitted from the drawings in order to clearly describe the present invention, and similar reference signs are assigned to similar parts through the entire specification.

In the entire specification, a case where a certain part "is connected to (accesses, is in contact with, or is coupled to)" another part includes not only a case where the parts are "directly connected" to each other, but also a case where the parts are "indirectly connected" to each other with another member interposed therebetween. In addition, a case where a certain part "includes" a certain configurational element means a case where another configurational element is not excluded but can be further included, unless specifically described otherwise.

Terms used in this specification are only used to describe a specific embodiment and are not intentionally used to limit the present invention. A word having a singular form includes its plural form, unless obviously implied otherwise in context. In this specification, words such as "to include" or "to have" are construed to specify that a feature, a number, a step, an operation, a configurational element, a member, or a combination thereof described in the specification is present and not to exclude presence or a possibility of addition of one or more other features, numbers, steps, operations, configurational elements, members, or combinations thereof in advance.

Hereinafter, the present invention will be described in detail with reference to the accompanying drawings.

Figure 1:
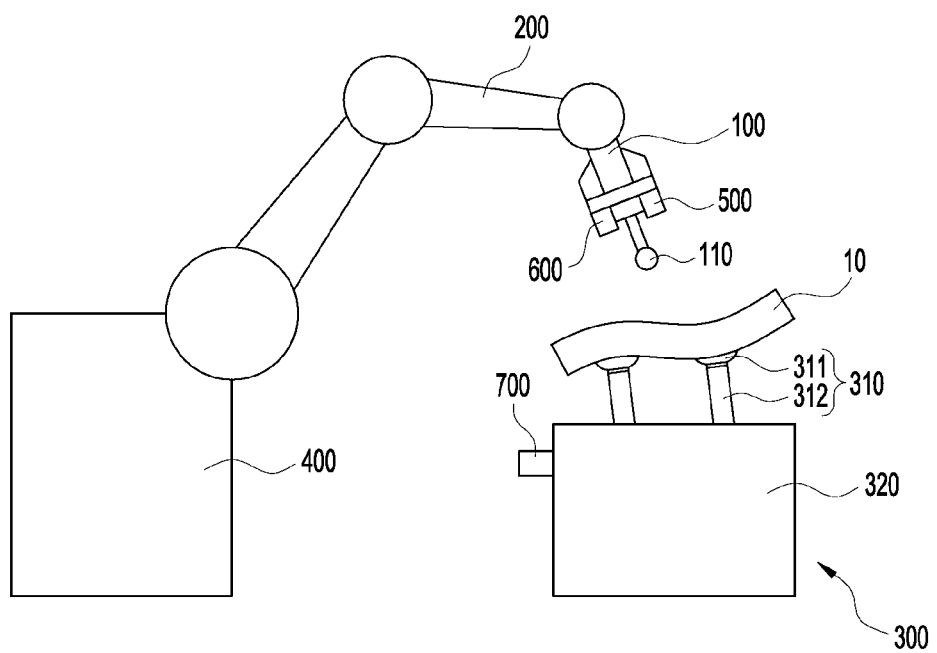
FIG. 1 is a schematic view of a robot system according to an embodiment of the present invention.
Figure 2:
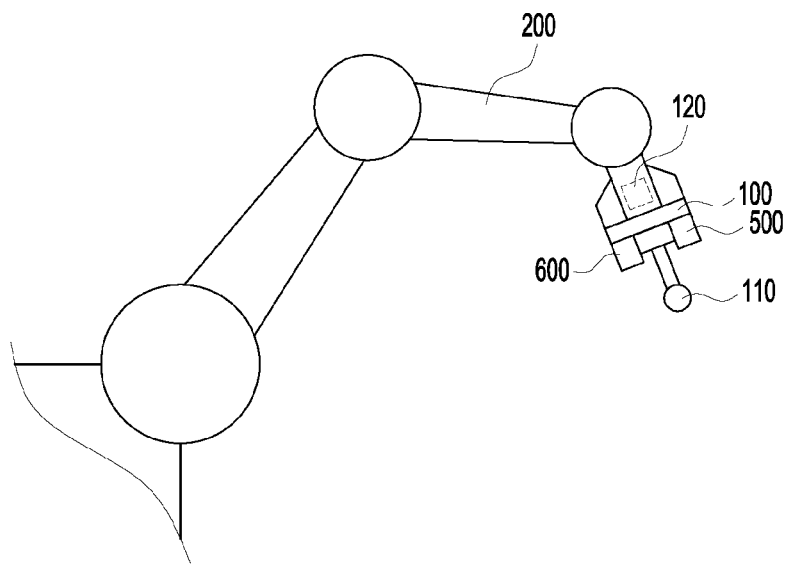
FIG. 2 is a schematic view of a robot according to the embodiment of the present invention.

FIG. 1 is a schematic view of a robot system according to an embodiment of the present invention, and FIG. 2 is a schematic view of a robot 200 according to the embodiment of the present invention. Besides, FIG. 3 is a schematic view of a support 300 according to the embodiment of the present invention.

Figure 3:
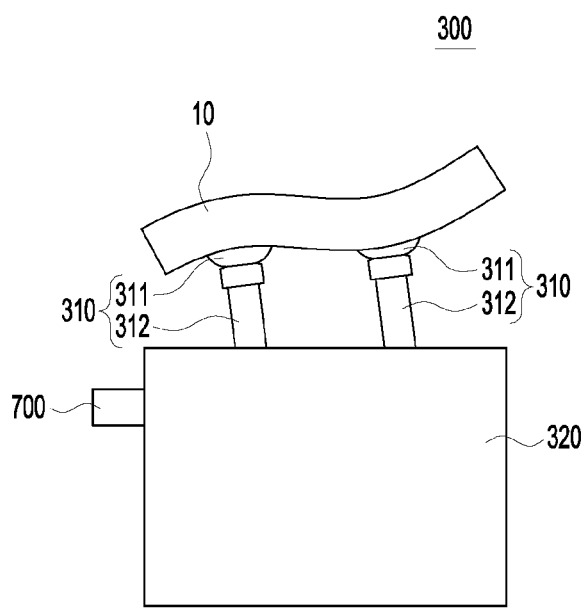
FIG. 3 is a schematic view of a support according to the embodiment of the present invention

As illustrated in FIGS. 1 to 3, there is provided a robot system which performs machining on a machining target 10, using a tool 110 provided on a machining unit 100, the robot system of the present invention including: the robot 200 that is coupled to the machining unit 100, moves the machining unit 100 to change a position of the tool 110 with respect to the machining target 10, and has a plurality of joints; the support 300 that supports the machining target 10 and moves the machining target 10 to change a position of the machining target 10 with respect to the tool 110; a sensor unit 120 that is provided on the machining unit 100 and measures an amount of current supplied to a machining motor which operates the tool 110 or an operation force of the tool 110; and a controller 400 that receives a measurement signal from the sensor unit 120 and transmits a control signal to the robot 200 or the support 300.

Besides, when a machining load value of the machining unit 100 is larger than a reference machining load value, the controller 400 can control the robot 200 or the support 300 to decrease relative movement speeds of the machining unit 100 and the machining target 10.

The machining unit 100 can move in up-down, right-left, and front-rear directions and also can perform a tilting motion in every direction by the robot 200.

(In the embodiment of the present invention, the tilting motion can mean a tilting motion in every direction on a three-dimensional coordinate.)

The machining unit 100 can perform drilling, milling, routing, or grinding on the machining target 10.

Here, the tool 110 can come into contact with a predetermined area of a surface of the machining target 10, and the machining unit 100 can cause the tool 110 to perform a rotating motion or a linear reciprocating motion such that a machining process such as a drilling process, a milling process, a routing process, or a grinding process can be performed.

Besides, the tool 110 wears as the machining process proceeds by the tool 110. When the machining process is performed using the worn tool 110, it is possible to increase a contact force between the tool 110 and the machining target 10 or to increase the number of motions per unit time of the tool 110, in order to obtain the same effect as that obtained when the machining process is performed on the machining target 10 using unworn tool 110.

When the contact force between the tool 110 and the machining target 10 increases, a frictional force between the tool 110 and the machining target 10 increases such that the machining load value of the tool 110 can increase and the amount of current supplied to the machining motor can also increase.

Besides, when the number of motions per unit time of the tool 110 increases, revolutions per minute (rpm) of the machining motor can increase, and the amount of current supplied to the machining motor can also increase.

As described above, when a machining load increases, the amount of current supplied to the machining motor which actuates the tool 110 increases, and thus it is possible to derive a machining load value of the tool 110 by measuring the amount of current supplied to the machining motor.

The sensor unit 120 can have a current measuring sensor which measures an amount of current supplied to the machining motor and a force measuring sensor which measures an operation force of the tool 110.

The force measuring sensor can measure a force of the rotating motion or a force of the linear reciprocating motion of the tool 110. Besides, when the operation force of the tool 110 increases, the machining load of the machining unit 100 can increase.

That is, it is possible to derive the machining load value based on a value of the amount of current supplied to the machining motor or a value of the operation force of the tool 110, and an average value of both machining load values can be determined as a machining load value of the machining unit 100.

Hence, it is possible to improve accuracy of the machining load value of the machining unit 100. However, the machining load value is not limited thereto, and it is possible to derive the machining load value of the machining unit 100 based only on the value of the amount of current supplied to the machining motor, or it is possible to derive the machining load value of the machining unit 100 based only on the operation force of the tool 110.

A correlation between the value of the amount of current supplied to the machining motor and the machining load value of the machining unit 100 or a correlation between the operation force of the tool 110 and the machining load value of the machining unit 100 can be acquired from experiments, and data thereof can be stored in the controller 400.

Hence, the controller 400 can derive the machining load value of the machining unit 100 based on the amount of current supplied to the machining motor.

The reference machining load value can be stored in the controller 400 in advance.

A case where the machining load value of the machining unit 100 is larger than the reference machining load value means that the number of motions per unit time of the operating tool 110 is larger than the number of motions per unit time of the tool 110 associated with the reference machining load value. In this case, when the tool 110 performs the machining process while the movement speed of the unworn tool 110 is maintained, the machining target 10 can be damaged.

Similarly, a case where the machining load value of the machining unit 100 is larger than the reference machining load value means that the operation force of the operating tool 110 is larger than the operation force of the tool 110 associated with the reference machining load value. In this case, when the tool 110 performs the machining process while the movement speed of the unworn tool 110 is maintained, the machining target 10 can be damaged.

Consequently, when the machining load value of the machining unit 100 is larger than the reference machining load value, stability of the robot 200 is degraded, and the machining target 10 can come into a defective state. Thus, it is possible to decrease relative movement speeds of the machining unit 100 and the machining target 10.

The controller 400 can have a position computing unit that stores three-dimensional shape data of the machining target 10 and computes relative positions of the tool 110 and the machining target 10, and an operation control unit that controls an operation of the robot 200 and an operation of the support 300 based on a position value of the tool 110 or a position value of the machining target 10 which are derived by the position computing unit.

The machining unit 100 has a first position sensor to measure the position of the tool 110, and the support 300 has a second position sensor to measure the position of the machining target 10. Besides, the position computing unit can receive positional information of the tool 110 and positional information of the machining target 10 from the first position sensor and the second position sensor and can compute relative positions of the tool 110 and the machining target 10 so as to be suitable for a process in progress by using the positional information.

The operation control unit can receive a derived computation value from the position computing unit and can transmit a control signal to the robot 200 and the support 300 so as to control operations of the robot 200 and the support 300.

As illustrated in FIGS. 1 and 2, the robot system of the present invention can further include an imaging unit 500 that is coupled to the machining unit 100 and acquires an image of the machining target 10.

The imaging unit 500 can transmit the image of the machining target 10 to the controller 400, and the controller 400 can compare the transmitted image of the machining target 10 and the three-dimensional shape data of the machining target 10 stored in the position computing unit.

Besides, the controller 400 can compare the image of the machining target 10 and the three-dimensional shape data of the machining target 10, thereby comparing the image of the machining target 10 and a working region of the surface of the machining target 10 derived from the three-dimensional shape data of the machining target 10 so as to correct relative positions of the tool 110 and the machining target 10.

The relative positions of the tool 110 and the machining target 10 can include not only relative three-dimensional positions of the tool 110 and the machining target 10 but also an angle formed between a central axis of the tool 110 and a normal line to the working region of the surface of the machining target 10.

As illustrated in FIGS. 1 and 2, the robot system of the present invention can further include a dust removing unit 600 that is coupled to the machining unit 100 and removes dust on the surface of the machining target 10.

The dust removing unit 600 has a shape of a duct and is coupled to the machining unit 100, and the dust removing unit 600 can be installed inside the robot 200 to be connected to an inlet hose for drawing air in. Besides, the inlet hose can be connected to an inlet pump that supplies a force to draw air in.

The dust removing unit 600 connected to the inlet hose by actuation of the inlet pump can draw dust in and can draw in and remove dust on the surface of the machining target 10 as a position of the dust removing unit 600 changes depending on movement of the machining unit 100.

The support 300 can have a jig unit 310 that comes into contact with the machining target 10 to support the machining target 10 and adjusts a position angle of the machining target 10 with respect to the tool 110, and a jig driving unit 320 that is coupled to the jig unit 310 and causes the jig unit 310 to move and perform a tilting motion.

Here, the position angle can be an angle formed between the central axis of the tool 110 and the normal line to the working region of the surface of the machining target 10.

A plurality of jig units 310 can be provided on the support 300. In addition, the jig driving unit 320 can move the jig unit 310 in the up-down, right-left, and front-rear directions, thereby enabling the jig unit 310 to move the machining target 10 in the up-down, right-left, and front-rear directions, or the jig driving unit 320 enables the jig unit 310 to perform the tilting motion in every direction to cause the machining target 10 to have an inclination.

The jig unit 310 can have a suction portion 311 at an end of the jig unit 310, the suction portion vacuum-suctioning one surface of the machining target 10 that is not the surface of the machining target 10 which is brought into contact with the tool 110. Besides, the jig unit 310 can have a suction-portion supporting portion 312 that is coupled to the suction portion 311 and moves in the up-down, right-left, and front-rear directions.

The suction portion 311 fixes the machining target 10 by vacuum suction, an angle of the suction portion 311 is adjustable such that the suction portion 311 can easily suction the one surface of the machining target 10 which is a curved surface. Besides, the suction portion 311 may be made of a flexible material to increase a vacuum suction force.

The machining unit 100 can have a temperature measuring unit that measures a temperature of the surface of the machining target 10 which is brought into contact with the tool 110.

The machining target 10 can deteriorate or can be deformed due to an increase in temperature depending on a material of the machining target 10.

Therefore, the temperature measuring unit can measure a temperature of the surface of the machining target 10 in real time and can decrease the machining load value of the machining unit 100 when the temperature of the surface of the machining target 10 which is measured by the temperature measuring unit is higher than a reference temperature stored in the controller 400 in advance.

The temperature measuring unit can have a contactless temperature measuring sensor that measures a temperature by irradiating the surface of the machining target 10 with an infrared ray.

The robot system of the present invention can further include a wear measuring unit 700 that measures an amount of wear of the tool 110. As illustrated in FIG. 3, the wear measuring unit 700 can be coupled to the support 300.

The tool 110 provided on the machining unit 100 can be detached from the machining unit 100. Besides, the detached tool 110 can be placed on the wear measuring unit 700. Here, the wear measuring unit 700 can measure weight of the detached tool 110.

The wear measuring unit 700 can compare weight of the unworn tool 110 and weight of the detached tool 110 to measure the reduced weight of the tool 110 due to wearing of the unworn tool 110 and can compute an amount of wear of the tool 110 based on the reduced weight of the tool 110.

That is, a reduction in weight of the tool 110 can be proportional to the amount of wear of the tool 110.

A cutting system including the robot system of the present invention can be built.

A system for producing a carbon fiber reinforced plastic (CFRP) product which includes the robot system of the present invention can be built.

It is possible to produce products having various shapes due to characteristics of a carbon fiber reinforced plastic (CFRP) material, and thus a product made of the carbon fiber reinforced plastic (CFRP) material may have a complicated shape. Besides, there are many cases where the carbon fiber reinforced plastic (CFRP) material forms a large-sized product shape.

Consequently, when machining is performed on the carbon fiber reinforced plastic (CFRP) using the robot system of the present invention, it is possible to improve a quality of the carbon fiber reinforced plastic (CFRP) product.

Hereinafter, a method for adjusting a machining load using the robot system of the present invention will be described.

In the first step, the sensor unit 120 can measure an amount of current supplied to the machining motor. In the second step, the controller 400 can receive a measurement signal from the sensor unit 120.

In the third step, the controller 400 can derive a machining load value of the tool 110 based on the amount of current supplied to the machining motor and compare the machining load value of the tool 110 and the reference machining load value.

In the fourth step, the controller 400 can transmit a control signal to the robot 200 or the support 300 when the machining load value of the tool 110 is larger than the reference machining load value.

In the fifth step, the movement speed of the tool 110 with respect to the machining target 10 can be decreased under operation control of the robot 200 or the support 300.

The description of the present invention described above is provided as an example, and a person of ordinary skill in the art to which the present invention belongs can understand that it is possible to easily modify the present invention to another embodiment without altering the technical idea or an essential feature of the present invention. Therefore, the embodiments described above need to be understood as exemplified embodiments in every aspect and not as limiting embodiments. For example, configurational elements described in a singular form can be realized in a distributed manner. Similarly, the configurational elements described in the distributed manner may be realized in a combined manner.

The scope of the present invention needs to be represented by the claims to be described below, and meaning and the scope of the claims and every modification or modified embodiment derived from an equivalent concept of the claims need to be construed to be included in the scope of the present invention.

REFERENCE SIGNS LIST

10 MACHINING TARGET
100 MACHINING UNIT
110 TOOL
120 SENSOR UNIT
200 ROBOT
300 SUPPORT
310 JIG UNIT
311 SUCTION PORTION

312 SUCTION-UNIT SUPPORTING PORTION
320 JIG DRIVING UNIT
400 CONTROLLER
500 IMAGING UNIT
600 DUST REMOVING UNIT
700 WEAR MEASURING UNIT

What is claimed is:

1. A robot system for adjusting a machining load depending on tool wear which performs machining on a machining target using a tool provided on a machining unit, the robot system comprising:
   a robot that is coupled to the machining unit, moves the machining unit to change a position of the tool with respect to the machining target, and has a plurality of joints;
   a support that supports the machining target and moves the machining target to change a position of the machining target with respect to the tool;
   a sensor unit that is provided on the machining unit and measures an amount of current supplied to a machining motor which operates the tool or an operation force of the tool;
   a wear measuring unit that measures an amount of tool wear based on a reduction in a weight of the tool;
   a temperature measuring unit that measures a temperature of a surface of the machining target after a period of time that the surface is brought into contact with the tool; and
   a controller that receives a measurement signal from the sensor unit and transmits a control signal to the robot and the support,
   wherein the controller derives a machining load value of the machining unit based on an average of a value of the measured amount of current supplied to the machining motor and a value of the operation force of the tool;
   wherein, when the machining load value of the machining unit is larger than a reference machining load value, the controller controls the robot or the support to decrease relative movement speeds of the machining unit and the machining target;
   wherein the temperature measuring unit decreases the machining load value in response to the temperature of the surface of the machining target being higher than a reference temperature stored in the controller;
   wherein the support has a jig unit that comes into contact with the machining target to support the machining target and adjusts a position angle of the machining target with respect to the tool;
   wherein the jig unit comprises a first suction portion coupled to a first suction-portion supporting portion, and a second suction portion coupled to a second suction-portion supporting portion, the first suction-portion supporting portion coupled to the first suction-portion supporting portion and the second suction portion coupled to the second suction-portion supporting portion being arranged at an end of the support and spaced apart from each other;
   the robot system further comprising a jig driving unit that is coupled to the jig unit and causes the first suction-portion supporting portion and the second suction-portion supporting portion to move and perform a tilting motion in every direction in a three-dimensional coordinate system by moving the first suction-portion supporting portion and the second suction-portion supporting portion in an up-down, a right-left, and a front-rear direction; and
   wherein when the jig driving unit causes the jig unit to move and perform the tilting motion, the first suction-portion supporting portion is caused to lengthen relative to the second suction-portion supporting portion, or the second suction-portion supporting portion is caused to lengthen relative to the first suction-portion supporting portion, and
   the tilting motion of the first suction-portion supporting portion and the second suction-portion supporting portion is performed while maintaining an orientation along a straight axis;
   wherein the controller has
      a position computing unit that stores three-dimensional shape data of the machining target and computes relative positions of the tool and the machining target, and
      an operation control unit that controls an operation of the robot and an operation of the support based on a position value of the tool or a position value of the machining target which are derived by the position computing unit; and
   wherein the controller is configured to compare an image of the machining target and the three-dimensional shape data of the machining target to correct relative positions of the tool and the machining target, the relative positions of the tool and the machining target including relative three-dimensional positions of the tool and the machining target, and an angle formed between a central axis of the tool and a normal line to a working region of the surface of the machining target.

2. The robot system for adjusting a machining load depending on tool wear according to claim 1,
   wherein the machining unit performs drilling, milling, routing, or grinding on the machining target.

3. The robot system for adjusting a machining load depending on tool wear according to claim 1, further comprising:
   an imaging unit that is coupled to the machining unit and acquires an image of the machining target.

4. The robot system for adjusting a machining load depending on tool wear according to claim 1, further comprising:
   a dust removing unit that is coupled to the machining unit and removes dust on the surface of the machining target.

5. A cutting system comprising:
   the robot system for adjusting a machining load depending on tool wear according to claim 1.

6. A system for producing a carbon fiber reinforced plastic (CFRP) product, comprising:
   the robot system for adjusting a machining load depending on tool wear according to claim 1.

7. A method for adjusting a machining load using the robot system for adjusting the machining load depending on tool wear according to claim 1, the method comprising:
   i) a step in which the sensor unit measures the amount of current supplied to the machining motor;
   ii) a step in which the controller receives the measurement signal from the sensor unit;
   iii) a step in which the controller derives the machining load value of the machining unit based on the average of the value of the measured amount of current supplied to the machining motor and the value of the operation force of the tool, and compares the machining load value of the machining unit and the reference machining load value;

iv) a step in which the controller transmits a control signal to the robot or the support when the machining load value of the machining unit is larger than the reference machining load value; and
v) a step in which a movement speed of the machining unit with respect to the machining target is decreased under operation control of the robot or the support.

8. The robot system for adjusting a machining load depending on tool wear according to claim 1, wherein the temperature measuring unit includes a contactless temperature measuring unit configured to measure a temperature by irradiating the surface of the machining target with an infrared ray.

\* \* \* \* \*